(12) United States Patent
Hildebrand

(10) Patent No.: US 6,856,456 B2
(45) Date of Patent: Feb. 15, 2005

(54) DEVICE AND SYSTEM FOR THE OPTICAL TRANSMISSION OF DATA BETWEEN SATELLITES

(75) Inventor: Ulrich Hildebrand, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/297,954
(22) PCT Filed: Apr. 12, 2002
(86) PCT No.: PCT/DE02/01383
§ 371 (c)(1), (2), (4) Date: May 12, 2003
(87) PCT Pub. No.: WO02/084902
PCT Pub. Date: Oct. 24, 2002

(65) Prior Publication Data
US 2003/0193711 A1 Oct. 16, 2003

(30) Foreign Application Priority Data
Apr. 12, 2001 (DE) ........................ 101 18 335

(51) Int. Cl.$^7$ ................................ H01S 3/00
(52) U.S. Cl. ..................................... 359/349
(58) Field of Search ................. 359/349, 629; 398/121

(56) References Cited

U.S. PATENT DOCUMENTS

| | | | |
|---|---|---|---|
| 3,536,922 A | 10/1970 | Ito | ............................. 398/131 |
| 3,764,213 A | 10/1973 | O'Meara | ..................... 356/5.1 |
| 3,825,845 A * | 7/1974 | Angelbeck et al. | ........ 359/349 |
| 4,661,786 A * | 4/1987 | Bender | ........................ 359/240 |
| 5,450,223 A * | 9/1995 | Wagner et al. | ............. 398/121 |
| 5,661,582 A * | 8/1997 | Kintis et al. | ............... 398/121 |
| 5,940,045 A | 8/1999 | Belcher et al. | ............ 343/850 |
| 6,016,219 A | 1/2000 | Fatehi et al. | .......... 359/341.43 |
| 6,061,170 A * | 5/2000 | Rice et al. | .................. 359/345 |
| 6,271,953 B1 * | 8/2001 | Dishman et al. | ........... 398/129 |
| 6,297,897 B1 * | 10/2001 | Czichy et al. | .............. 398/122 |
| 6,590,685 B1 * | 7/2003 | Mendenhall et al. | ....... 398/121 |
| 6,665,063 B2 * | 12/2003 | Jamieson et al. | ........ 356/141.1 |
| 2001/0005273 A1 * | 6/2001 | Fischer et al. | ............. 359/159 |

OTHER PUBLICATIONS

Eskildsen, L. et al., "Optical amplifiers for WDM systems and networks," Military Communications Conference, 1994, IEEE Fort Monmouth, NJ, New York, NY, pp. 350–356.

* cited by examiner

Primary Examiner—Thomas H. Tarcza
Assistant Examiner—Deandra M. Hughes
(74) Attorney, Agent, or Firm—Kenyon & Kenyon

(57) ABSTRACT

The invention concerns an apparatus and a system for the transfer of optical data between satellites, which encompasses a laser oscillator (10) for generating an optical signal, a modulator (11) for modulating the optical signal with data information, and an amplifier assemblage, a collimator assemblage, and a transmission device for transfer of the signals.

Provision is made for a preamplifier (12) to be connected to a power divider section (13) downstream from which is a parallel circuit of at least two phase shifters (14) and main amplifiers (15), respectively connected in series, for amplification and adjustment of the optical signals; and for the main amplifiers (15) to be connected, via a bundle (16) of optical waveguides corresponding to the number of series circuit(s), to the corresponding number of collimators (17).

12 Claims, 2 Drawing Sheets

Fig. 3
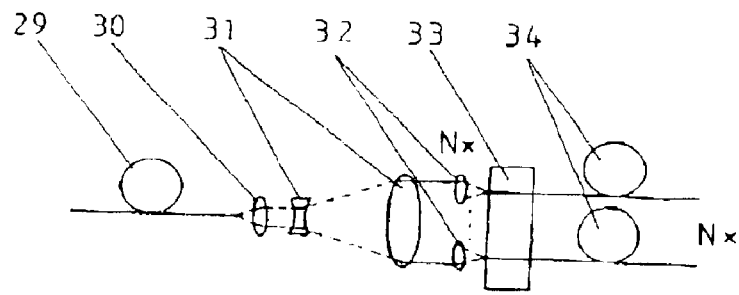
Fig. 4
Fig. 5
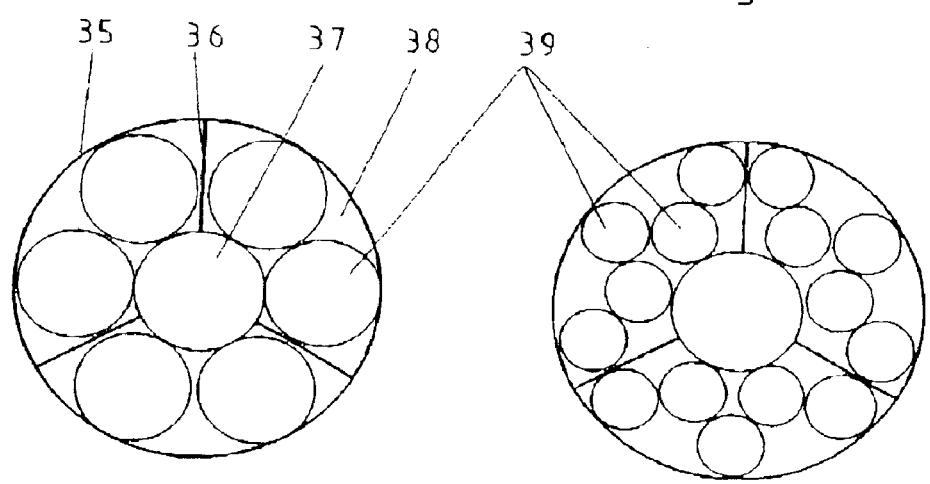

US 6,856,456 B2

DEVICE AND SYSTEM FOR THE OPTICAL TRANSMISSION OF DATA BETWEEN SATELLITES

BACKGROUND OF THE INVENTION

It is known to use optical high-power transmitters for optical free-space transfer between satellites. A transmission system known per se for optical transfer of data between satellites is depicted in FIG. 1. In this, a laser oscillator 1 supplies an optical signal of constant power and frequency with a narrow spectral width. The subsequent electrooptical modulator 2 impresses the data information onto the signal. Modulation for impressing the data to be transferred onto the optical signal can be accomplished either by amplitude modulation or by way of one of the various phase modulation systems (PSK).

The optical signal generated in this fashion is conveyed to a first optical preamplifier 3. In preamplifier 3, embodied as a fiber amplifier, the optical power of the signal is elevated to a level of, typically, one watt. By way of a downstream crystal amplifier 4, the optical signal is amplified to a high optical level necessary for transfer. The power section of the amplifier chain is embodied in fiber-coupled fashion in order to convey the beams, by way of fiber 5, over a greater distance to the remote optical unit. From laser oscillator 1 and as far as collimator 6, the optical signal is guided in a fiber 5. All fibers 5 in the system are polarization-retaining. The optical beam is conveyed via collimator 6, via an optional transit/receive splitter 7 and displacement mirror 8 for beam alignment, to mirror telescope 9, and from there to the counterpart station.

A disadvantage of this apparatus for optical transfer of data is that for systems with a very high transmitting power, the demands in terms of signal separation between the transmit and receive paths become so great that they can no longer be met within a shared optical path. It is then necessary to separate the two paths completely, i.e. to use a separate telescope 9 for transmitter and receiver. Although transmit/receive splitter 7 is omitted in such a case, the use of an additional mirror telescope 9 nevertheless causes overall costs for the system to rise considerably.

ADVANTAGES OF THE INVENTION

The apparatus according to the present invention for optical transfer of data between satellites having the features recited in Claim 1 has, in contrast, the advantage that high data rates can be transferred over very long distances. Data rates can be up to 10 Gbit/s, and can be transferred as far as 90,000 km in the context of a connection between two satellites in geostationary orbit. Because a preamplifier is connected to a power divider section downstream from which is a parallel circuit of at least two phase shifters and main amplifiers, respectively connected in series, for amplification and adjustment of the optical signals; and because the main amplifier is connected, via a bundle of optical waveguides corresponding to the number of series circuits, to the corresponding number of collimators, the advantageous result is that the output power level for transfer of a data rate of up to 10 Gbit/s is amplified to a requisite order of magnitude of approx. 10 W with no need to increase the power of the amplifier. Parallel connection of an arbitrary number of identical amplifiers allows very high optical output power levels to be achieved. A special amplifier for high output power levels is not necessary; instead, medium-power units can be used for optical transfer of the data. The result of connecting the individual amplifiers in parallel is that a very high overall efficiency for the amplifier unit can be attained.

A further advantage of the approach according to the present invention is that because the optical signals are conveyed in fibers, the entire system can be configured more flexibly. The optical power level in each individual fiber is moderate. When a single amplifier or a cascade of amplifiers is used, the optical power densities are considerably more difficult to manage. In addition, parallel connection of the transmission amplifiers enhances the system reliability of the assemblage. Failure of one section does not, as in the case of a chain, inevitably result in total loss of the overall system, but instead still permits operation with diminished performance.

In a preferred embodiment of the invention, a phase regulation unit is associated with each of the phase shifters. The result is on the one hand that the optical phase is measured and stabilized independently of the optical intensity. On the other hand, the phase regulation unit effects adaptation of the apparatus as a transmission or baking unit. For the transfer of very high data rates, a strong, sharply collimated transmission beam is absolutely necessary. The requirements are approximately the opposite for the search and acquisition phase: the beam could be spread out somewhat more, since for this phase the bandwidth to be transferred is not as great, and the power level at the receiver can thus be greatly reduced. The phase regulation unit according to the present invention performs a continual widening of the transmission beam up to approximately 10 times the nominal transmission beam. The ratio between minimum and maximum beam opening depends on the design of the system and, in particular, on the number of individual transmitters. The enlarged transmission lobe simplifies the search algorithms.

In the system according to the present invention for optical transfer of data between satellites having the features recited in Claim 19, provision is made for at least two systems according to the present invention to be present in the satellites.

Further advantageous embodiments of the invention are evident from the features recited in the dependent claims.

DRAWINGS

The invention will be explained in more detail below in an exemplified embodiment, referring to the appended drawings in which:

FIG. 3 shows a variant of the approach according to the present invention, as a detail;

FIG. 4 shows a detail of the approach according to the present invention; and

FIG. 5 shows a variant of FIG. 4.

DESCRIPTION OF THE EXEMPLIFIED EMBODIMENT

Figure 1:
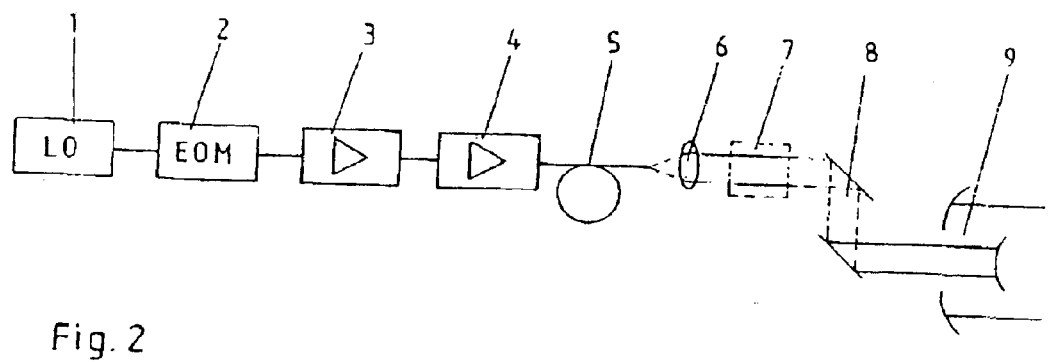
FIG. 1 is a schematic view of an apparatus for optical transfer of data corresponding to the known related art.
Figure 2:
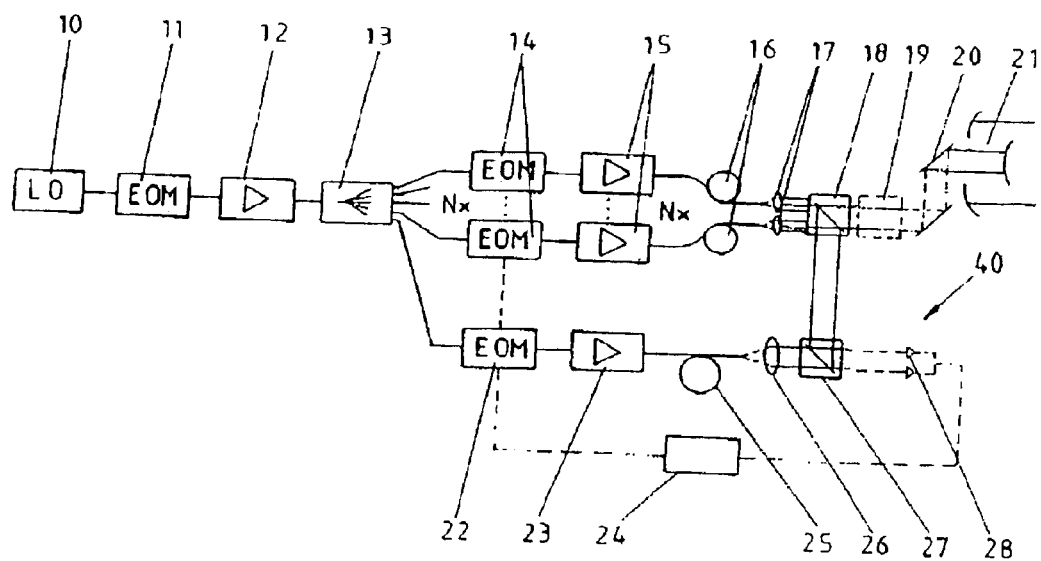
FIG. 2 is a schematic view of an apparatus for optical transfer of data corresponding to the approach according to the present invention.

FIG. 2 is a schematic view of an apparatus for optical transfer of data between satellites, depicted as a block diagram. The first sections of the high-power transmitter for optical transfer of data comprise a laser oscillator 10 (known per se) for generating an optical signal at constant power and frequency and with a narrow spectral width, and an electrooptical modulator 11 with which the data to be transferred are modulated onto the optical signal. An optical preamplifier 12 downstream from modulator 11 increases the optical power level of the signal in order to compensate for losses in the subsequent radiation-forming sections and ensure sufficient input power for main amplifier 15 (explained in more detail later). The optical signal described exhaustively below, amplified and adjusted according to the present invention, is conveyed in a manner known per se, via a transmit/receive splitter 19 and a displacement mirror 20, to a mirror telescope 21 for transfer.

According to the present invention, the optical signal modulated with the data to be transferred travels from preamplifier 12 to a radiation-forming unit. The radiation-forming unit comprises a power divider section 13 and multiple phase shifters 14 disposed in parallel. In a further section, the optical signal coming from phase shifters 14 is amplified by means of a main amplifier 15 positioned after one of the respective phase shifters 14. With phase shifters 14, any desired adjustment of the phase positions of the individual optical beams is performed. Adjustment and regulation of the phase positions by way of phase shifters 14 is discussed in more detail later on.

Power divider section 13 can be embodied as a tree of polarization-retaining waveguide couplers. According to this variant, power divider 13 will be used (sic—?connected) via fiber-optic cables, in accordance with tree 16, with subsequent phase shifters 14 and main amplifiers 15 that are positioned in parallel.

A variant of the embodiment of power divider section 13 combined with phase shifters 14 is depicted in FIG. 3. Here the power is distributed over a free-space beam and then coupled directly into phase shifter bank 33. Power divider 13 with phase shifters 14 comprises a collimator 30, a highly anamorphic telescope 31, and a corresponding lens assemblage 32 that couples the power into phase shifter bank 33. Power divider section 13 is connected at the input end via a glass fiber 29 to preamplifier 12, and phase shifter 14 is connected at the output end via corresponding glass fibers 34 to the respective main amplifiers 15.

Phase shifter bank 33 is either embodied monolithically—i.e. all the waveguides with their electrodes are positioned on one crystal wafer made of lithium niobate—or phase shifter bank 33 is of modular configuration, respective individual modulators being present.

Phase shifters 14 that are downstream (in parallel) from power divider section 13 each comprise an electrooptical modulator. As a function of the applied voltage, the electrooptical modulator adjusts the optical density and thus the phase of the optical signal. If this modulator is embodied as a waveguide modulator, bandwidths of up to several GHz can be achieved. The result of this is that in the receiving station, the transmission beam can be more easily detected in the search and acquisition phase. The power level of the receiving station can thereby be considerably reduced. The phase shifter bank can again be embodied in either monolithic or modular fashion.

If narrow bandwidths of only a few kHz are sufficient for the phase adjustment, for each of the corresponding phase shifters 14 a glass fiber is wound around a piezo core. An applied voltage modifies the diameter of the piezo core and thus also the length of the fiber and the transit time through the fiber, thereby adjusting the phase of the optical signal.

The phase control performed in phase shifter 14 allows the setting of various emission angles with reference to the optical axis of mirror telescope 21. This capability can be used to set lead angles or tracking angles. Since the adjustment takes place with no moving masses, very high angular velocities and bandwidths are possible.

The optical signal travels via fiber-optic cable tree 16 from phase shifters 14 to a main amplifier 15 positioned after each phase shifter 14. Optical main amplifiers 15 increase the power of the signal for each channel to a level of approx. 0.5 W. The output power level of optical main amplifiers 15 is monitored, and can be adapted to requirements. Main amplifier 15 is embodied as a corresponding fiber amplifier.

From main amplifier 15, the amplified optical signal travels via fiber-optic cable tree 16 to collimators 17 for subapertures 39. The beams from the individual collimators 17 must be aligned exactly parallel to one another. For each number of individual transmitters, a maximum packing density is desirable. FIGS. 4 and 5 each show the shadow image of the exit pupil of collimator 17, a different number of subapertures 39 being depicted in the individual Figures. The pupil is delimited by edge 35 of a primary mirror, which is joined via at least two struts 36 to a centrally positioned mirror 37. The shadows are created by struts 36 for retaining the secondary mirror, and by mirror 37 itself. Subapertures 39 are positioned in the available area 38 of the primary mirror. It is evident from FIGS. 4 and 5 that lens systems which, so to speak, have no edge—i.e. have only a very thin mount—are desirable for subapertures 39.

The amplitude distribution of the transmitter can be adapted to the exit pupil of a mirror telescope 21. The usual shadows resulting from the second mirror and retaining struts 36, and the power losses associated therewith, are avoided. The effort involved in suppressing the return reflections occurring at these points is also eliminated.

The optical beam emerging from collimator 17 is conveyed via an outcoupling divider 18, optional transmit/receive splitter 19, and displacement mirror 20 to mirror telescope 21, and transmitted from there to the counterpart station.

Adjustment and regulation of the optical phases in subapertures 39 requires a measurement thereof. For that purpose, outcoupling divider 18 diverts a test beam corresponding to approx. 1% of the transmission beam, and conveys it to a mixer 27 of a phase regulating unit 40. The test beam is used for monitoring and regulation of the phase setting. For that purpose, in mixer 27 the test beam is superimposed on a reference beam, and the phase positions of all subapertures 39 are measured using a photodiode field 28. The reference beam is picked off at power divider 13, and conveyed to a phase shifter 22 of phase frequency unit 40. The reference beam thus has the same frequency as the transmission beam to be measured. In phase shifter 22, the reference phase can be compensated and also modulated. An optical amplifier 23 ensures a sufficient level at photodiode field 28. Glass fibers 25, with which the individual components of phase regulation unit 40 are connected, convey the light and the optical signal to a collimator 26, which generates a perfect phase front that travels via optical mixer 27 onto photodiode field 28. Superimposition of the individual beams onto the reference beam allows the optical phase to be detected as an intensity by the photodiodes of photodiode field 28. Optical amplifier 28 is optional, and can be omitted if the signal-to-noise ratio at photodiodes 28 is sufficient. Photodiode field 28 is connected via a controller 24 to phase shifter 22 of phase regulation unit 40. For regulation and adjustment of the optical signal, an output terminal of phase shifter 22 of phase regulation unit 40 is connected to the respective phase shifters 14 of the apparatus for optical transfer of data.

By measuring the phase of mirror telescope 21, it is possible to compensate for all the phase aberrations of the components preceding it. The requirements in terms of the thermomechanical stability of the entire optical system are thus reduced. Phase regulation unit 40 performs several tasks. It generates the signal for modulation of the reference phase with phase shifter 22. When a high-frequency modulation is utilized, the use of an electrical phase regulation system allows the optical phase to be measured, and thus stabilized, independently of the optical intensity.

A distinction may be made among three phase adjustment operating modes.

The normal operating situation for the optical high-power transmitter is a sharply collimated transmission beam in which maximum power density in the far field is demanded. This requires that the phases of the individual transmitters be precisely coordinated with one another. Phase differences of 10° or less must be achieved. For the case of maximum beam spread during the acquisition phase, the phase relationship among the individual subapertures 39 must be totally eliminated. The transmitters must, so to speak, be summed incoherently. The phase at the modulators of phase shifters 14 must be fully modeled very quickly and independently of the others, so that the receiver is unaware of these changes. This means that the frequency of the phase changes at the transmitter must be substantially greater than the bandwidth of the receiver. Noise sources or digital random-number generators can be used for this. In the special instance of angle adjustment, a phase gradient over the entire aperture is necessary. This makes it possible, using the known "phased array" technique, to set lead angles or tracking angles within a limited angular region. The achievable bandwidth is defined by the modulators and thus very high, especially as compared to mechanical solutions. The angular region is limited to the diffracting aperture of an individual subaperture 39.

In the system according to the present invention for optical transfer of data between satellites, provision is made for at least two systems according to the present invention to be present in the satellites.

The advantage of the approach according to the present invention is therefore that because the individual phase shifters and main amplifiers are connected in parallel, the signal to be transmitted is amplified in such a way that high data rates can be transferred over very long distances between two satellites. In addition, the apparatus can be set by the control unit in such a way that it can operate as both a transmitting and a receiving station. An additional mirror telescope for the receiving station is not necessary.

LIST OF REFERENCE NUMBERS

1 Laser oscillator
2 Electrooptical modulator
3 Optical preamplifier
4 Crystal amplifier
5 Fiber
6 Collimator
7 Transmit/receive splitter
8 Displacement mirror
9 Mirror telescope
10 Laser oscillator
11 Electrooptical modulator
12 Preamplifier
13 Power divider section
14 Phase shifter
15 Main amplifier
16 Fiber-optic cable tree (bundle of optical waveguides)
17 Collimator
18 Outcoupling divider
19 Transmit/receive splitter
20 Displacement mirror
21 Mirror telescope
22 Phase shifter
23 Optical amplifier
24 Controller
25 Glass fiber
26 Collimator
27 Mixer
28 Photodiode field
29 Glass fiber
30 Collimator
31 Telescope
32 Lens assemblage
33 Phase shifter bank
34 Glass fiber guide
35 Edge on a primary mirror
36 Struts
37 Mirror
38 Area
39 Subapertures
40 Phase regulation unit

What is claimed is:

1. An apparatus for transferring optical data between satellites, comprising:
   a laser oscillator for generating an optical signal;
   a modulator for modulating the optical signal with data information, wherein the modulator is connected to the laser oscillator downstream from the laser oscillator;
   a preamplifier connected in series to the modulator downstream from the modulator, wherein the preamplifier amplifies the optical power of the optical signal;
   a power divider unit connected in series to the preamplifier downstream from the preamplifier; and
   a parallel circuit connected to the power divider unit downstream from the power divider unit, wherein the parallel circuit includes at least two branches, each branch including a phase shifter and a main amplifier connected in series, wherein each main amplifier performs power amplification of the optical signal, and wherein the main amplifiers are connected, via a plurality of optical waveguides corresponding to the number of branches in the parallel circuit, to a corresponding number of collimators.

2. The apparatus as recited in claim 1, wherein the power divider unit includes a plurality of polarization-retaining waveguide couplers that are connected to the phase shifters.

3. The apparatus as recited in claim 1, wherein the power divider unit is combined with the phase shifters form a combined unit, and wherein the combined unit includes a collimator, a highly anamorphic telescope downstream from the collimator, a lens assemblage downstream from the telescope for dividing the optical signal, and a phase shifter bank for transmitting the optical signal via glass fiber guides to the main amplifiers.

4. The apparatus as recited in claim 1, wherein each phase shifter is an electro-optical modulator for adjusting the optical density and the phase as a function of the applied voltage.

5. The apparatus as recited in claim 4, wherein the electro-optical modulator is a waveguide modulator.

6. The apparatus as recited in claim 1, wherein the main amplifier is a fiber amplifier.

7. The apparatus as recited in claim 1, further comprising a phase regulation unit associated with the phase shifters.

8. The apparatus as recited in claim 7, wherein the phase regulation unit includes, in a series circuit, a phase shifter, an amplifier, a collimator, a mixer, a photodiode field, and a controller.

9. The apparatus as recited in claim 8, wherein an input terminal of the phase shifter in the phase regulation unit is connected to the power divider section for delivery of a reference beam to the phase regulation unit, and an output terminal of the phase shifter in the phase regulation unit is connected to the phase shifters in the parallel circuit for adjustment of the optical signal.

10. The apparatus as recited in claim 7, wherein the phase regulation unit maintains a constant phase difference among the collimators.

11. The apparatus as recited in claim 10, wherein the phase regulation unit regulates the phase difference among the collimators to be zero.

12. The apparatus as recited in claim 7, wherein the phase regulation unit sets a quasi-random phase difference at a high frequency.

* * * * *